United States Patent
Jeong

(10) Patent No.: US 6,831,946 B1
(45) Date of Patent: Dec. 14, 2004

(54) DEVICE AND METHOD FOR CODING IMAGE

(75) Inventor: Je Chang Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/435,607

(22) Filed: Nov. 8, 1999

(51) Int. Cl.$^7$ .................................................. H04N 7/12
(52) U.S. Cl. ............. 375/240.01; 375/240; 375/240.02; 375/240.11; 375/240.12; 375/240.18; 375/240.19
(58) Field of Search ........................... 375/240, 240.18, 375/240.19, 240.01, 240.12, 240.02; 348/398.1; 382/239, 246

(56) References Cited

U.S. PATENT DOCUMENTS

| | | | | | |
|---|---|---|---|---|---|
| 5,657,085 A | * | 8/1997 | Katto | ....................... | 348/398.1 |
| 5,949,912 A | * | 9/1999 | Wu | ............................. | 382/246 |
| 5,953,460 A | * | 9/1999 | Wu | ............................. | 382/239 |
| 5,982,434 A | * | 11/1999 | Tong et al. | ............. | 375/240.11 |
| 6,055,017 A | * | 4/2000 | Shen et al. | ............. | 375/240.11 |

FOREIGN PATENT DOCUMENTS

| | | | | | |
|---|---|---|---|---|---|
| EP | | 0817494 A2 | * | 1/1998 | ............ H04N/7/26 |

\* cited by examiner

*Primary Examiner*—Chris Kelley
*Assistant Examiner*—Allen Wong
(74) *Attorney, Agent, or Firm*—Birch, Stewart, Kolasch & birch, LLP

(57) ABSTRACT

Device and method for coding an image for compressing a digital video signal, including the steps of (1) transforming a spatial domain of the video signal into frequency domain, and dividing the frequency domain into subband regions having relatively much meaningful information on an original video signal and subband regions having no relatively much meaningful information on the original video signal, (2) classifying the divided-subband regions into a plurality of scan blocks each having a block size, and (3) scanning in a scan block unit, whereby increasing a probability of consecutive zero run statistically, to improve the compression ratio.

15 Claims, 5 Drawing Sheets

DEVICE AND METHOD FOR CODING IMAGE

BACKGROUND OF THE INVENTION

1. Field of the Invention

The present invention relates to device and method for coding an image, and more particularly, to device and method for coding an image, in which wavelet transformed sub-bands are scanned in horizontal or vertical blocks suitable for the sub-band characteristic.

2. Background of the Related Art

There is the wavelet transform as one of transform methods for coding a video signal, which is means similar to the Fourier Transform for disassembling a signal in a time (space) domain into respective frequency components. The wavelet transform improves a locality of the time domain in a high frequency region and a locality of a frequency domain in a low frequency region.

FIG. 1 illustrates a structure of a sub-band region when a video signal is wavelet transformed.

Referring to FIG. 1, it is well known that, as a result of subjecting a video signal to a wavelet transform, a structure divided into sub-band region becomes to have a low frequency region which contains relatively more meaningful information on the video signal and is concentrated on one side thereof, and a high frequency region which contains relatively less meaningful information on the video signal and is concentrated on the other side thereof. That is, low frequency components of an original video is gathered to the most coarse band (F0) and fine high frequency components are gathered to bands (F1~F9) other than the coarse band. All the coefficients for given bands except the lowest frequency band have relations with coefficients for the next sub-band in a similar direction. That is, of the nine sub-band regions F1~F9 in the wavelet transformed sub-band regions shown in FIG. 1, F1, F4 and F7 regions show horizontal edge components of the video signal, and F2, F5 and F8 regions show vertical edge components, and F3, F6 and F9 regions show diagonal components. Therefore, if the wavelet transformed respective sub-band regions are scanned in different paths (horizontal, vertical and diagonal) by using such a characteristic, a more effective video compression can be made. That is, as shown in FIG. 2, by scanning the F1, F4 and F7 regions which have horizontal edge components in a horizontal direction, the F2, F5 and F8 regions which have vertical edge components in a vertical direction, and the F3, F6 and F9 regions which have diagonal edge components in a diagonal direction, a continuous edge portion scan can be made. And, by doing so, a better compression ratio can be obtained in an arithmetic coding conducted later owing to a statistical characteristic (a probability is increased, in which consecutive zero runs are occurred by scanning in a direction that shows the edge components).

However, a necessary and satisfactory compression ratio may not be obtained only by scanning each subband in directions proper to the subband characteristic. That is, as shown in FIG. 3, if the F7 regions is reviewed in detail, it can be known that even if a horizontal edge component F7a also has many pixels in a vertical direction. Therefore, if the subband F7 is simply scanned in a horizontal direction, there will be a zero run which is not continuous occurred at an end portion of a horizontal edge, that causes a reduction of the compression ratio than expected in an arithmetic coding in a later stage.

SUMMARY OF THE INVENTION

Accordingly, the present invention is directed to device and method for coding an image that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for coding an image for compressing a digital video signal, includes the steps of (1) transforming a spatial domain of the video signal into frequency domain, and dividing the frequency domain into subband regions having relatively much meaningful information on an original video signal and subband regions having no relatively much meaningful information on the original video signal, (2) classifying the divided subband regions into a plurality of scan blocks each having a block size, and (3) scanning in a scan block unit, whereby increasing a probability of consecutive zero run statistically, to improve the compression ratio.

A transform, such as wavelet transform, is applied to the video signal for transforming the video signal into an appropriate frequency domain.

In other aspect of the present invention, there is provided a device for coding an image including transforming means for transforming a spatial domain of an input image into a frequency domain, and classifying the frequency domain into subband regions having a variety of resolution, scan controlling means for classifying the classified subband regions into a plurality of scan blocks each having fixed sizes, and scanning means for scanning in the scan block unit.

The scan controlling means adaptively applies a width: length size of the scan block depending on an edge component of the subband region each scan block belongs thereto being in a horizontal direction, a vertical direction, or diagonal direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 4:
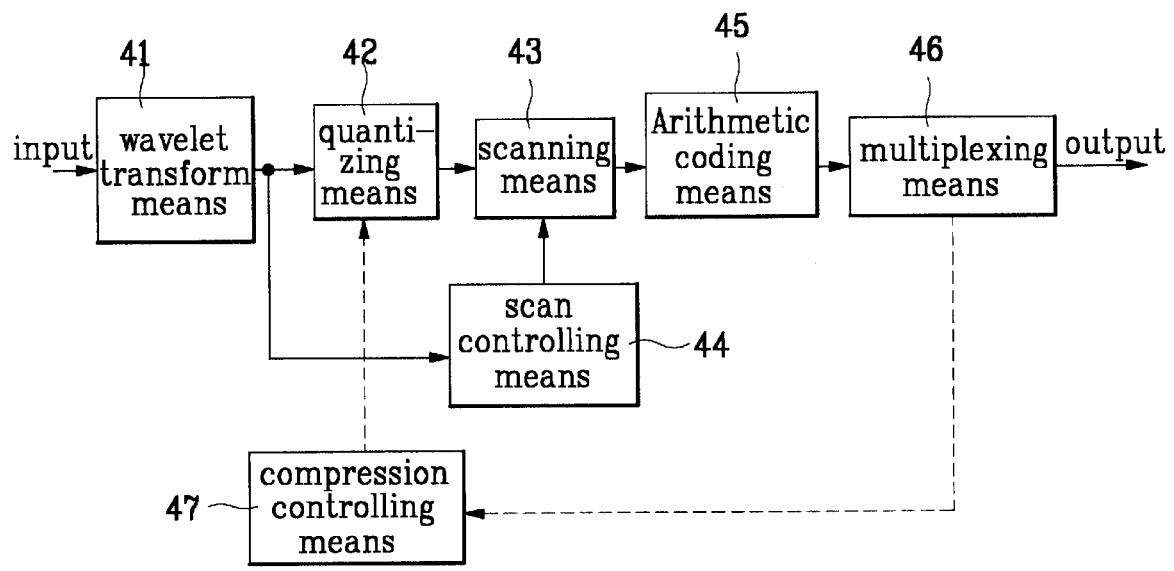
FIG. 4 illustrates a block diagram of a device for coding an image in accordance with a preferred embodiment of the present invention.

Reference will now be made in detail to the preferred embodiments of the present invention, examples of which are illustrated in the accompanying drawings. FIG. 4 illustrates a block diagram of a device for coding an image in accordance with a preferred embodiment of the present invention.

Referring to FIG. 4, the device for coding an image in accordance with a preferred embodiment of the present invention includes wavelet transform means 41 for subjecting an input video signal to the wavelet transform, quantizing means 42 for quantizing a signal from the wavelet transform means 41, scan controlling means 44 for dividing subband regions of the quantized signal into a plurality of scan blocks by using information on the wavelet transformed video signal, and controlling to scan the scan blocks by the scan block, scanning means 43 for scanning the subband regions by the scan block under the control of the scan controlling means 44, arithmetic coding means 45 for conducting a statistical coding of the video signal information scanned by the scanning means 43 based on a probability according to presence of pixel values, multiplexing means 46 for multiplexing the coded video signal information, and compression controlling means 47 for controlling the quantizing means 42 and the multiplexing means 46 for controlling a video compression.

Figure 5:
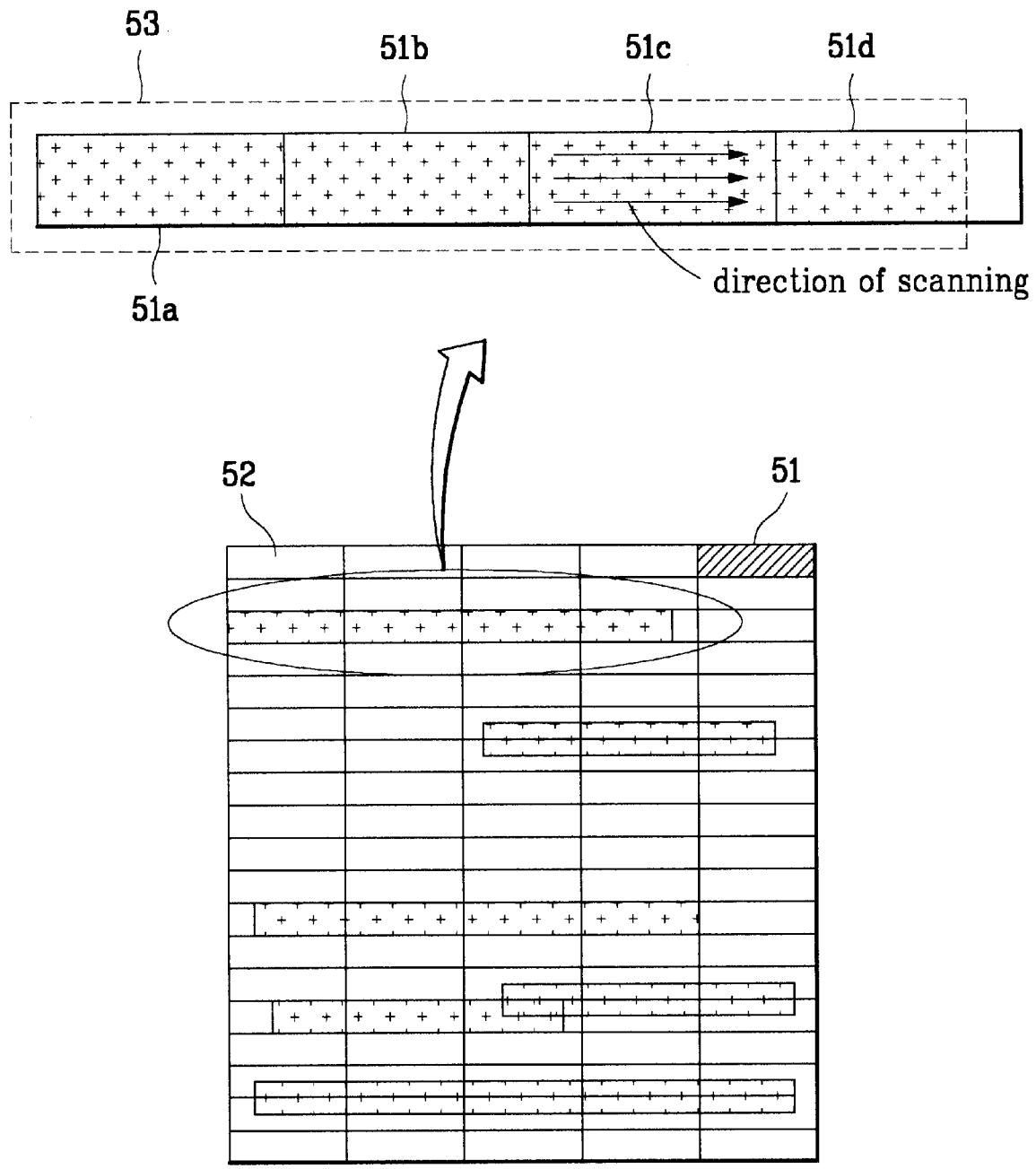
FIG. 5 illustrates a method for coding an image in accordance with a first preferred embodiment of the present invention; and, FIG. 6 illustrates a method for coding an image in accordance with a second preferred embodiment of the present invention.
Figure 6:
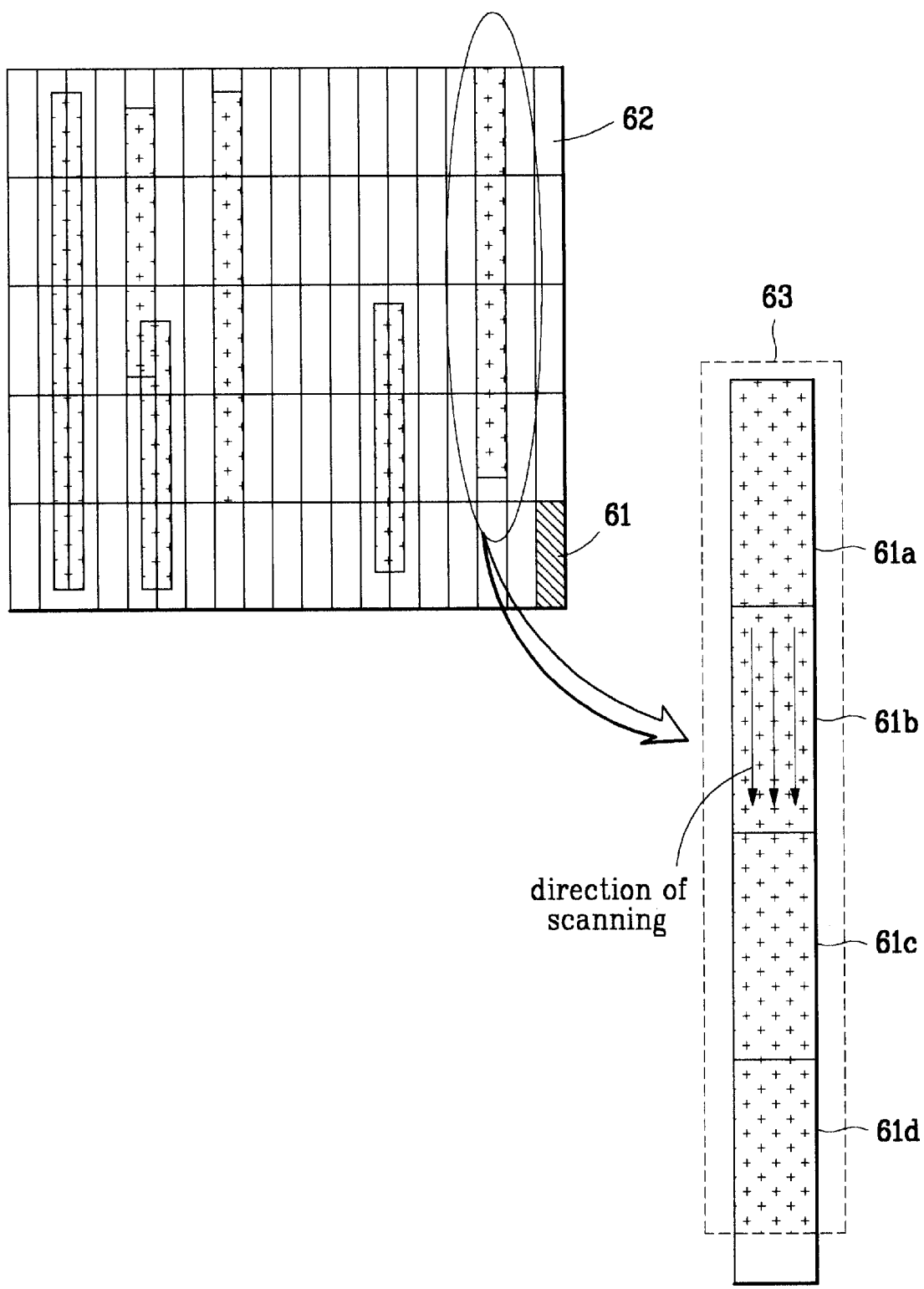

FIG. 5 illustrates a method for coding an image carried out by the aforementioned device for coding a video signal in accordance with a first preferred embodiment of the present invention, wherein an example of a method for scanning subband regions exhibiting horizontal edge components is shown, and FIG. 6 illustrates a method for coding an image carried out by the aforementioned device for coding a video signal in accordance with a first preferred embodiment of the present invention, wherein an example of a method for scanning subband regions exhibiting vertical edge components is shown. Because a method substantially identical to the methods shown in FIGS. 5 and 6 are applicable much wider and in a greater variety than the methods shown in FIGS. 5 and 6, the method is not limited to the methods shown in FIGS. 4~6. Embodiments of the present invention will be explained with reference to FIGS. 4 and 5.

Figure 1:
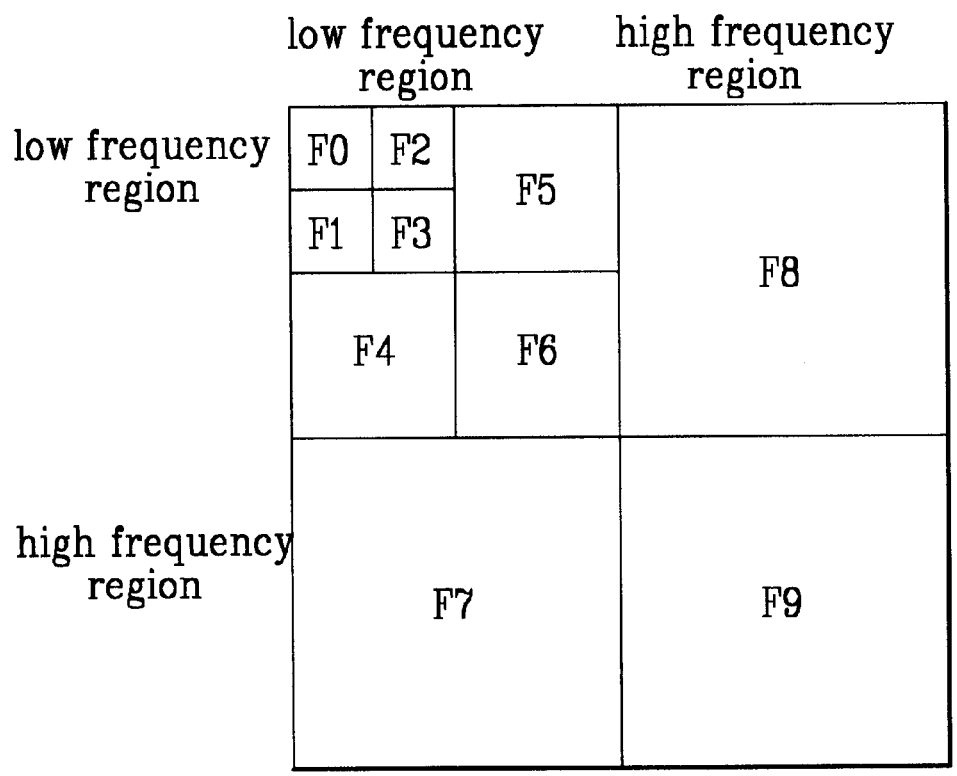
FIG. 1 illustrates a structure of a sub-band region when a video signal is wavelet transformed as a related art video coding method.
Figure 2:
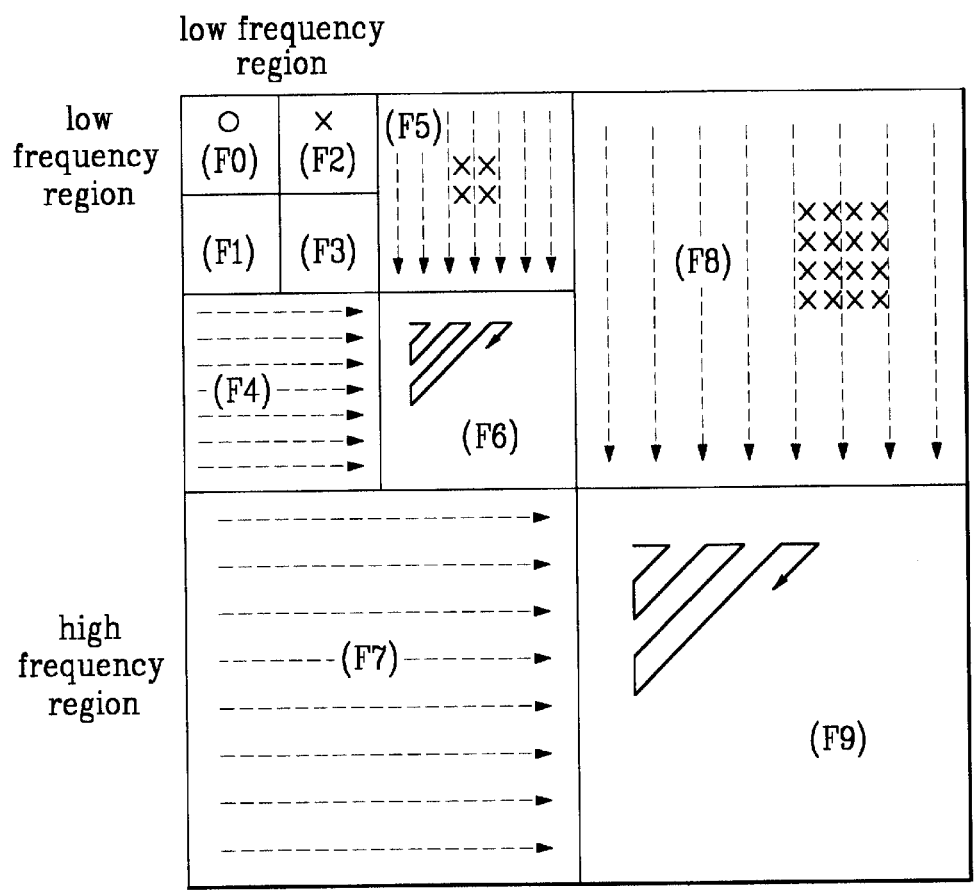
FIG. 2 illustrates a related art subband scanning method as a video coding method.
Figure 3:
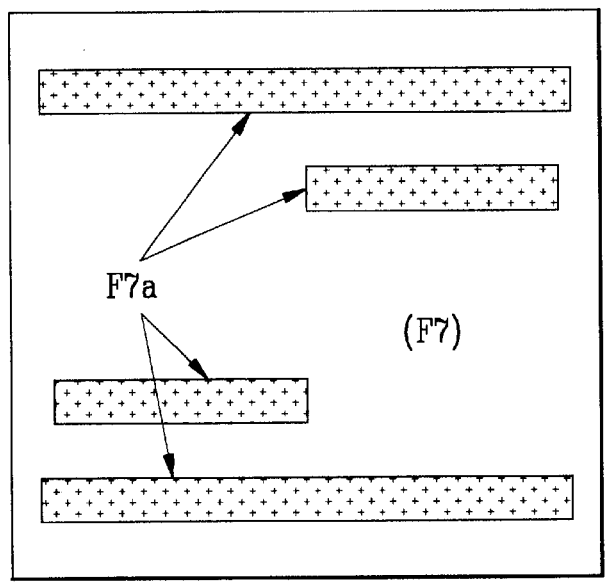
FIG. 3 illustrates an enlarged view of F7 region in FIG. 2.

An input video signal provided to the wavelet transform means 41 is transformed into frequency information. That is, as shown in FIGS. 1~3, the wavelet transformed video signal becomes to have subband region forms. The wavelet transformed video signal provided to the quantizing means 42 is quantized in quantizing steps corresponding to the video signal information, and, at the same time, provided to the scan controlling means 44 for use as information for controlling the scanning means 43. The scanning means 43 scans the video signal information from the quantizing means appropriately in a substantially identical method as shown in FIGS. 5 and 6 under the control of the scan controlling means 44.

Assuming that one subband region Fn is a subband region having horizontal edge components, the subband region Fn is shown in FIG. 5. Since the subband region shown in FIG. 5 is a subband region having horizontal edge components (such as F1, F4 and F7 regions in FIG. 1), the scan controlling means 44 divides the subband region into a plurality of scan blocks each having a size of width>length. The scanning means 43 scans the subband region in the scan block unit under the control of the scan controlling means 44. That is, the scanning means 43 divides the subband region in FIG. 5 into 'n' scan blocks 51, and scans scan blocks 52 having no meaningful information on the actual video signal, and scan blocks having meaningful information (horizontal edge components) 53 on the actual video signal. For example, a horizontal scanning is carried out for all horizontal edge components 53 in a scan block 51a, a horizontal scanning is carried out for all horizontal edge components in a scan block 51b, a horizontal scanning is carried out for all horizontal edge components in a scan block 51c, and a horizontal scanning is carried out for all horizontal edge components in a scan block 51d. In comparison to the related art, this scanning method maximizes a possibility that portions having horizontal edge components (values) and portions having '0' values actually within the subband regions are presented in succession, statistically. Therefore, if the video signal information scanned thus is subjected to variable length coding (VLC) in the arithmetic coding means 45 at a later stage, and multiplexed in the multiplexing means 46 at a later stage, a compression ratio of a finally provided video signal is increased. Though horizontal scanning in the scan blocks 51a~51d is explained, vertical or diagonal scanning also can be carried out with easy.

Referring to FIG. 6, assuming that one subband region Fn is a subband region having vertical edge components, the subband region Fn is shown in FIG. 6. Since the subband region shown in FIG. 6 is a subband region having vertical edge components (such as F2, F5 and F8 regions in FIG. 1), the scan controlling means 44 divides the subband region into a plurality of scan blocks each having a size of width<length. The scanning means 43 scans the subband region in the scan block unit under the control of the scan controlling means 44. That is, the scanning means 43 divides the subband region in FIG. 6 into 'n' scan blocks 61, and scans scan blocks 62 having no meaningful information on the actual video signal, and scan blocks having meaningful information (VLC) (vertical edge components) 63 on the actual video signal. For example, a vertical scanning is carried out for all vertical edge components 63 in a scan block 61a, a vertical scanning is carried out for all vertical edge components in a scan block 61b, a vertical scanning is carried out for all vertical edge components in a scan block 61c, and a vertical scanning is carried out for all horizontal edge components in a scan block 61d. In comparison to the related art, this scanning method maximizes a possibility that portions having vertical edge components (values) and portions having '0' values actually within the subband regions are presented in succession, statistically. Therefore, if the video signal information scanned thus is subjected to variable length coding (VLC) in the arithmetic coding means 45 at a later stage, and multiplexed in the multiplexing means 46 at a later stage, a compression ratio of a finally provided video signal is increased. Though vertical scanning in the scan blocks 61a~61d is explained, horizontal or diagonal scanning also can be carried out with easy.

In the method for coding an image shown in FIGS. 5 and 6, a data transform is explained with reference to embodiment in which a video signal is transformed into frequency information having subband regions, a transform method having a zero tree structure can do substantially the same transform. And, the method for coding an image shown in FIGS. 5 and 6 is applicable to a series of video signal: frequency transform method that is selected as an effective one according to a known and system characteristics, for improving the compression ratio. The method for coding a video signal for compressing the video signal is, for example, a scanning method in the wavelet transform. Particularly, by classifying the wavelet transformed subbands into horizontal and vertical blocks suitable for the subband characteristics in scanning the subbands, a probability of consecutive zero run occurrence is increased in view of statistics, that increases a compression ratio.

It will be apparent to those skilled in the art that various modifications and variations can be made in device and method for coding an image of the present invention without departing from the spirit or scope of the invention. Thus, it is intended that the present invention cover the modifications and variations of this invention provided they come within the scope of the appended claims and their equivalents.

What is claimed is:

1. A method for coding an image, comprising the steps of:
    (1) transforming a spatial domain of a video signal into frequency domain, and classifying the frequency domain into subband regions having relatively much meaningful information on an original video signal and subband regions having no relatively much meaningful information on the original video signal;
    (2) dividing each of the classified subband regions into a plurality of scan blocks each having a fixed size, wherein a width:length size of the scan block is adaptively decided depending on an edge component of the subband region to which each scan block belongs, the edge component being in a horizontal direction, a vertical direction, or a diagonal direction; and,
    (3) scanning each of the scan blocks divided in each of the subband regions in a vertical, horizontal, or diagonal direction depending on respective scan block characteristics.

2. A method as claimed in claim 1, wherein the dividing step in the step (1) includes the step of using a wavelet transform.

3. A method as claimed in claim 1, wherein the width:length size of the scan block is width>length when the subband region has a horizontal edge component.

4. A method as claimed in claim 3, wherein a horizontal scan is carried out in the scan blocks in the subband showing horizontal edge components.

5. A method as claimed in claim 1, wherein the width:length size of the scan block is width<length when the subband region has a vertical edge component.

6. A method as claimed in claim 5, wherein a vertical scan is carried out in the scan blocks in the subband showing vertical edge components.

7. A device for coding an image comprising:
    transforming means for transforming a spatial domain of an input image into a frequency domain, and classifying the frequency domain into subband regions having a variety of resolution;
    scan controlling means for dividing each of the classified subband regions into a plurality of scan blocks each having a fixed size, wherein the scan controlling means adaptively applies a width:length size of the scan block depending on an edge component of the subband region to which each scan block belongs, the edge component being in a horizontal direction, a vertical direction, or a diagonal direction; and,
    scanning means for scanning each of the scan blocks divided in each of the subband regions in a vertical, horizontal, or diagonal direction depending on respective scan block characteristics.

8. A device as claimed in claim 7, wherein the transform means subjects the input image to a wavelet transform.

9. A device as claimed in claim wherein the transform means transforms an original video signal such that a relatively large amount of meaningful information is contained in a significant subband region.

10. A device as claimed in claim 7, wherein the frequency domain in the transform means is classified in an order of extents containing information required for reproducing an image.

11. A device as claimed in claim 7, wherein the scan controlling means control is such that the width:length size of the scan block is width>length when the subband region has a horizontal edge component.

12. A device as claimed in claim 7, wherein the scan controlling means control is such that the width:length size of the scan block is width<length when the subband region has a vertical edge component.

13. A device as claimed in claim 7, further comprising: arithmetic coding means for conducting a statistical coding on video signal information output from the scanning means.

14. A device as claimed in claim 13, further comprising: multiplexing means for multiplexing the coded video signal information output from the arithmetic coding means.

15. A device as claimed in claim 14, further comprising: compression control means for controlling the multiplexing means to control video compression.

* * * * *